Patented May 29, 1945

2,376,896

UNITED STATES PATENT OFFICE 2,376,896

PREPARATION OF CARBONACEOUS BASE EXCHANGE MATERIAL

Abraham Sidney Behrman, Chicago, Ill., assignor to Infilco Incorporated, Chicago, Ill., a corporation of Delaware No Drawing. Application August 13, 1942, Serial No. 454,744

4 Claims. (Cl. 252—179)

This invention relates to an improved method of preparing base exchange, or, as it is sometimes broadly called, "zeolite" material for use in the treatment of liquids, such as the softening of water.

One of the objects of this invention is to provide a base exchange material of increased capacity.

Another object of the invention is to provide a more economical process for the preparation of a base exchange material.

A further object of this invention is to provide an improved carbonaceous zeolite.

A still further object is to provide an improved method of, and material for, softening water.

Further objects of the invention will be apparent from the description and claims which follow.

For many years hard waters have been softened by treating with greensand or other siliceous zeolite. Such treatment resulted in the exchange of calcium and magnesium ions in solution in the water being treated for sodium ion of the zeolite. The material was capable of regeneration upon exhaustion by treatment with a solution of a sodium salt, such as common salt, which substituted new sodium for the magnesium and calcium which had become attached to the zeolite, whereby the material was again able to extract calcium and magnesium ions from the water and substitute sodium ions therefor. Within the past decade this field of treatment has expanded enormously to the use of artificial base exchange material, sometimes referred to as "carbonaceous zeolite." Carbonaceous zeolite is customarily prepared by the treatment of a carbonaceous material, such as coal, with sulfuric acid, as has been described in the patents to Riley, No. 2,127,310, or Liebknecht No. 2,191,059 or 2,191,060, and others. Carbonaceous zeolite is now widely used because it has been found that in addition to the exchange of sodium for calcium or magnesium, such material can be prepared and regenerated to substitute hydrogen for all of the metal ions, including sodium as well as calcium and magnesium of the salt solution, which was impractical with the old siliceous zeolite. It is also possible by controlling the regeneration of the carbonaceous zeolite to prepare a material which in effect has a selective action to substitute hydrogen for the metal ions in the carbonates and bicarbonates without affecting the salts of a strong mineral acid; that is, such material can be prepared so as to remove all of the carbonates or bicarbonates from solution without substituting hydrogen for the metals in sulfates and chlorides. The reaction of such zeolites in water treatment are so well known that they need not be set forth herein.

Heretofore it has been customary to prepare the carbonaceous base exchange material by treating the carbonaceous material, preferably coal, with an excess of concentrated sulfuric acid. Where oleum or fuming sulfuric acid is used, the reaction usually is spontaneous with the development of a considerable amount of heat. Where concentrated acid only is used, it is customary to heat the reacting mixture to a temperature of about 200 to 220°. It has been found that the capacity of such material will vary somewhat depending upon the raw carbonaceous material used, upon the concentration of the acid used in the sulfonation process, and other conditions of manufacture. Generally material of this kind may be prepared for actual use by regeneration with a dilute solution of acid, a dilute solution of brine, or both, depending upon the conditions of the water treatment.

I have found that by preparing the carbonaceous base exchange material by what may be called a "split" or two-stage treatment, I am able to increase its cation exchange capacity, and to do so with less acid than heretofore possible. By a "split" treatment I mean the treatment of the carbonaceous material with a portion only of the sulfuric acid that ordinarily would be used for preparing such a base exchange material, such as one-third to one-half of the usual amount, carrying forward the treatment until the reaction ceases, whereupon the balance of the acid is added to the partially sulfonated material and the reaction is carried forward to the desired end product. The resultant carbonaceous zeolite is then washed and dried in the customary manner. The portion of acid to be used in the first stage is not critical, as I have used in the first step anywhere from one-fourth of the acid to the full quantity customarily used in the preparation of such material, and thereafter treating the carbonaceous material with additional concentrated sulfuric acid. I have found that if the acid treatment of the coal, or other carbonaceous material, is divided, the capacity of the material is definitely increased, both as to sodium exchange and as to hydrogen exchange, and that these improved results can be secured by using less acid than heretofore possible. This is shown by the following comparative tests:

EXAMPLE I

A quantity of fully prepared carbonaceous zeolite, that is, coal which had been treated by the usual amount of sulfuric acid was divided into two portions, one was washed and dried in the usual manner, while the second was treated with 27% oleum, 100 cc. of oleum to 100 cc. of carbonaceous zeolite. In the latter portion the temperature rose gradually and the mixture gave evidence of a rather slow reaction. After approximately two hours the mixture was poured cautiously into water and then washed and dried the same as the first sample, and the two samples were tested as to capacity. It was found that the second sample had consistently higher capacity for both the sodium exchange and hydrogen exchange, as shown in the following table:

Table I

|  | Capacity in grains per cubic foot of zeolite | |
|---|---|---|
|  | Regular zeolite | Zeolite prepared by two-stage acid treatment |
| *Regenerated with brine* | | |
| Run 1 | 9,700 | 10,600 |
| Run 2 | 8,700 | 10,200 |
| Run 3 | 8,900 | 10,600 |
| Run 4 | 9,100 | 11,000 |
| Run 5 | 9,300 | 11,000 |
| *Regenerated with acid* | | |
| Run 1 | 15,900 | 17,400 |
| Run 2 | 14,800 | 17,200 |
| Run 3 | 15,000 | 17,200 |
| Run 4 | 15,000 | 17,000 |

In each regeneration the beds, which were of equal size, were regenerated with equal amounts of dilute sodium chloride, namely, 100 cc. of sodium chloride per 100 cc. of zeolite bed when used for sodium exchange; or equal amounts of dilute sulfuric acid when used for hydrogen exchange, again 100 cc. of acid per 100 cc. of zeolite bed. The results tabulated in the table show that the base exchange material prepared by a two-stage treatment was consistently better than that prepared by a single treatment, and that there was less decrease of capacity in successive runs in the zeolite prepared by the two-stage treatment.

EXAMPLE II

Table 2 shows a comparative analysis of the exchange capacity of base exchange material prepared by the usual single-stage treatment and that prepared by two-stage treatment, illustrating three different proportions of acid to the zeolitic material in the second stage. Under the heading "Regular zeolite" is shown the result of exchange tests using base exchange material prepared by the usual methods. The next three columns show the results of tests for the exchange capacity of base exchange material prepared by the two-stage treatment. In each case the raw materials were the same. The regular material was treated with 20% oleum in the proportion of two parts, by volume, of coal to three parts, by volume, of acid. The material prepared by the two-stage treatment was first treated with acid of the same strength as used for the regular zeolite, and then divided into the three samples shown. In the second stage the amount and concentration of the acid varied, as follows:

In column A, the acid for the second stage was prepared from 66° sulfuric acid in the proportion of 4 volumes of acid to 3 volumes of water. To this acid solution was added 4 volumes of the partially sulfonated base exchange material and the mixture heated to boiling. The mixture was evaporated until practically all the free liquid was removed. The material was then cooled, washed with water and air dried and tested with the results shown.

The material shown in column B was prepared by taking the original first-stage base exchange material and treating 4 volumes of the material with a mixture of 1 volume of 20° oleum and 1 volume of 66° acid. The material is added to the acid and stirred, there being just about enough acid to moisten the material. There was evidence of some reaction as there was some evolution of $SO_2$ and there was a small rise in temperature. After the product had cooled, it was washed with water and air dried, and then tested with the results shown.

In column C 25 lbs. of the base exchange material was treated with a mixture of 17 lbs. of 66° sulfuric acid and 18 lbs. of 20% oleum following the same treatment as mentioned for the second stage of B. Except for the fact that there was more acid per unit of zeolite, the treatments were the same as shown under column B.

Table II

|  | Regular zeolite (single stage treatment) | Zeolite prepared by two stage treatment | | |
|---|---|---|---|---|
|  |  | A. 4 parts of 66° $H_2SO_4$ and 3 parts water per 4 parts zeolite | B. 1 part oleum and 1 part 66° $H_2SO_4$ per 4 parts zeolite | C. 17 lbs. 66° $H_2SO_4$ plus 18 lbs. oleum per 25 lbs. zeolite |
| *Regenerated with brine* | | | | |
| Run 1 | 8,900 | 10,000 | 9,100 | 10,400 |
| Run 2 | 8,500 | 10,000 | 10,000 | 10,200 |
| Run 3 | 8,900 | 8,900 | 9,500 | 9,500 |
| Run 4 | 8,500 | 8,700 | not tested | 9,300 |
| Run 5 | 8,500 | 8,700 | not tested | 10,000 |
| *Regenerated with acid* | | | | |
| Run 1 | 8,700 | 12,200 | 11,700 | 12,900 |
| Run 2 | 8,900 | 12,700 | 12,300 | 12,900 |
| Run 3 | 9,300 | 13,300 | 12,500 | 13,400 |
| Run 4 | 9,700 | 13,300 | 11,900 | 13,600 |
| Run 5 | 10,400 | 14,000 | 12,300 | 13,400 |

EXAMPLE III

Table III below shows another comparative test of the exchange capacities of material prepared by my new process and that prepared by the prior art. Column 1 shows the respective runs. Column 2 shows the capacities of cation exchange material prepared in the usual manner (sample A). This material was prepared from Pennsylvania coal and 27% oleum in the proportion of two volumes of coal to three volumes of acid. Upon mixture of the two there was a vigorous reaction, which resulted in a maximum temperature of about 160° C. This material was then washed with water, dried at 150° F., moistened and made into a bed for testing. Column 3 shows the comparative results of an exchange material prepared by my invention (sample B). The material of sample B was prepared from the same lot of coal as sample A. However, in this sample, 2 parts of coal, by volume, were first treated with 1 part, by volume, of 27% oleum. The reaction was not as vigorous as that developed with sample A, but did reach a temperature of 70° C. After a period, while still at the maximum temperature of 70° C., another two parts, by volume, of 27% oleum was added to the mixture, and thoroughly stirred. The material was allowed to cool, and then washed with water and dried at a temperature of 150° F.

| | Capacities, grains per cu. ft. | |
|---|---|---|
| | Sample A 1 step in sulfonation treatment | Sample B 2 steps in sulfonation treatment |
| *Regenerated with brine* | | |
| Run 1 | 10,600 | 11,200 |
| Run 2 | 10,400 | 11,000 |
| Run 3 | 10,200 | 11,200 |
| Run 4 | 9,700 | 11,000 |
| Run 5 | 9,700 | 11,000 |
| *Regenerated with acid* | | |
| Run 1 | 11,200 | 11,700 |
| Run 2 | 11,200 | 11,700 |
| Run 3 | 11,200 | 11,700 |
| Run 4 | 11,200 | 12,300 |
| Run 5 | 11,200 | 12,100 |

In the testing of the capacities of samples A and B as in the previous examples, beds of equal size were used, and they were regenerated with equal amounts of the same acid or brine regenerant. The material was prepared from two samples of the same coal, using equal quantities of acid, and both materials were washed and dried under identical conditions. The only difference was that one sample was prepared by the old, single-stage process, while the second was prepared by a two-stage process, modified by adding the second amount of acid before the first reaction was complete.

It might also be mentioned that it is possible to prepare an exchange material by applying the acid in three, or more, steps instead of two. When cation exchange material is prepared by adding the acid in three or more steps the material will have exchange capacities appreciably in excess of that prepared by a single stage treatment. It will have slightly better capacity than that prepared by a two stage process, but in many cases the capacity is not sufficiently increased to warrant the extra treatment.

A large number of tests have also shown that in the preparation of a cation exchange material of a given capacity, a smaller amount of acid can be used if the two-stage process of my invention is used. In commercial practice it is usually desired to prepare a product of the highest practical capacity, so that this phase of the invention may seldom be used. However, it is believed evident from the above that a smaller amount of acid applied in two steps will accomplish the preparation of a material of equal capacity with that prepared by applying a larger amount of acid in a single step.

It will be seen from this series of tests that by the process of my invention the following important results are secured: The exchange capacity of the zeolite is substantially increased; the increased capacity remains consistently high through subsequent regenerations even though the amount of regenerant is exactly the same as that used for ordinary zeolite, and for securing a given exchange capacity less acid is required by the two-stage treatment.

In this application the term "zeolite" is used in its broad sense to mean any anion or cation exchange material. Zeolite is, therefore, intended to include carbonaceous material having exchange properties, although in some technical aspects such material is not a true zeolite. In some instances, a distinction has been made between hydrogen zeolite and sodium zeolite. Both terms are used in their ordinary meaning: "hydrogen zeolite" to indicate any material, including carbonaceous, having a property of exchanging a hydrogen ion for other cations; and "sodium zeolite" to indicate any material, including carbonaceous, having a property of exchanging a sodium ion for other metallic ions such as calcium or magnesium. The term "sulfonating acid" is also used in its technical sense to include any of the agents suitable for introducing a sulfonic group into the carbonaceous material, and includes concentrated sulfuric acid, oleum or fuming sulfuric acid, sulfur trioxide, and the substituted acids, such as chlorosulfonic.

Manifestly many variations and modifications of the invention hereinbefore set forth may be made by a person skilled in the art without departing from the spirit and scope hereof.

I claim:

1. The method of preparing a carbonaceous base exchange material comprising treating a carbonaceous material with an amount of acid sufficient to partially sulfonate the carbonaceous material until the reaction substantially ceases, and thereafter treating the carbonaceous material with an amount of acid sufficient to substantially complete the sulfonation of the carbonaceous material.

2. A method of preparing a carbonaceous base exchange material comprising first treating coal with an amount of sulfuric acid insufficient to completely sulfonate the coal, and after termination of the first reaction treating the partially sulfonated coal with an additional amount of acid sufficient to secure substantially complete sulfonation of the coal.

3. A base exchange material prepared by treating a carbonaceous material with a sulfonating acid characterized by treating the carbonaceous material in two distinct steps, in the first of which the material is treated with an amount of acid insufficient to completely sulfonate the material, and in the second of which the material is treated with an amount of acid sufficient to complete the sulfonation of the partly sulfonated material.

4. A water softening base exchange material prepared by first treating coal with an amount of concentrated sulfonating acid insufficient to completely sulfonate the coal and after substantial completion of that reaction treating the coal with an amount of concentrated sulfonating acid sufficient to substantially complete the sulfonation of the partly sufonated coal.

ABRAHAM SIDNEY BEHRMAN.